United States Patent [19]

Harrison et al.

[11] 4,133,351

[45] Jan. 9, 1979

[54] METHOD AND APPARATUS FOR SEALING A PIPELINE LEAK

[75] Inventors: George W. Harrison, Houston; Billie G. Moore, Alvin, both of Tex.

[73] Assignee: Team, Inc., Alvin, Tex.

[21] Appl. No.: 763,632

[22] Filed: Jan. 28, 1977

Related U.S. Application Data

[62] Division of Ser. No. 677,864, Apr. 16, 1976, Pat. No. 4,073,836.

[51] Int. Cl.² .................. F16L 55/16; F16L 55/18
[52] U.S. Cl. ........................................ 138/97; 138/99; 285/15
[58] Field of Search ............. 138/97, 99; 285/15; 264/36; 425/11, 13, 14, DIG. 242; 249/90, 105

[56] References Cited

U.S. PATENT DOCUMENTS

| 1,620,154 | 3/1927 | Furman | 138/97 |
| 3,152,816 | 10/1964 | Smith | 138/97 |
| 3,467,141 | 9/1969 | Smith | 138/97 |
| 3,550,638 | 12/1970 | Smith | 138/99 |
| 3,770,301 | 11/1973 | Adams | 285/15 |
| 4,049,296 | 9/1977 | Harrison | 138/99 |

Primary Examiner—Richard R. Stearns

[57] ABSTRACT

In one exemplar embodiment, a method and apparatus are provided for sealing leaks which occur at the flanged connections of pipelines wherein a wire is wrapped about the upper surface of the flange connecting bolts for filling the gap between the flanges and above the bolts, an injection valve means is installed for relieving pressure from inside the gap while the wire is being wrapped and for injecting a sealant to the interior of the gap beneath the wire wrap, and a sealant is provided for filling the gap beneath the wire wrap for stopping the leak and combining with the wire wrap to provide a permanent repair for the leak.

1 Claim, 4 Drawing Figures

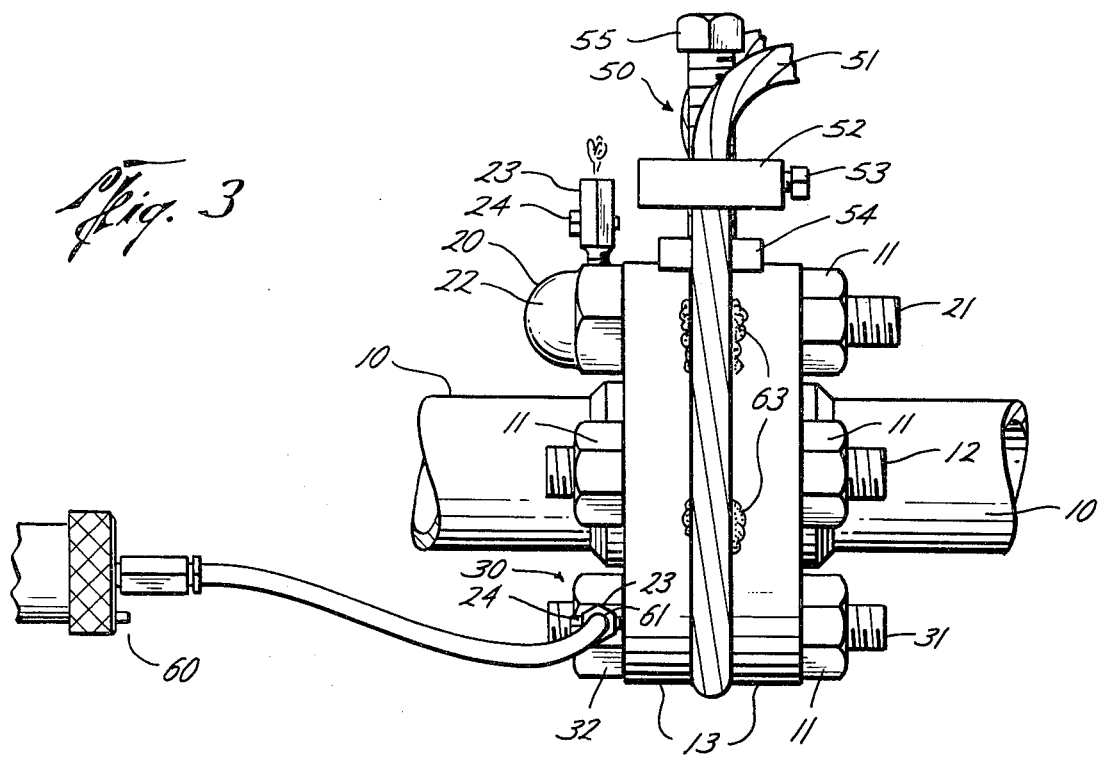
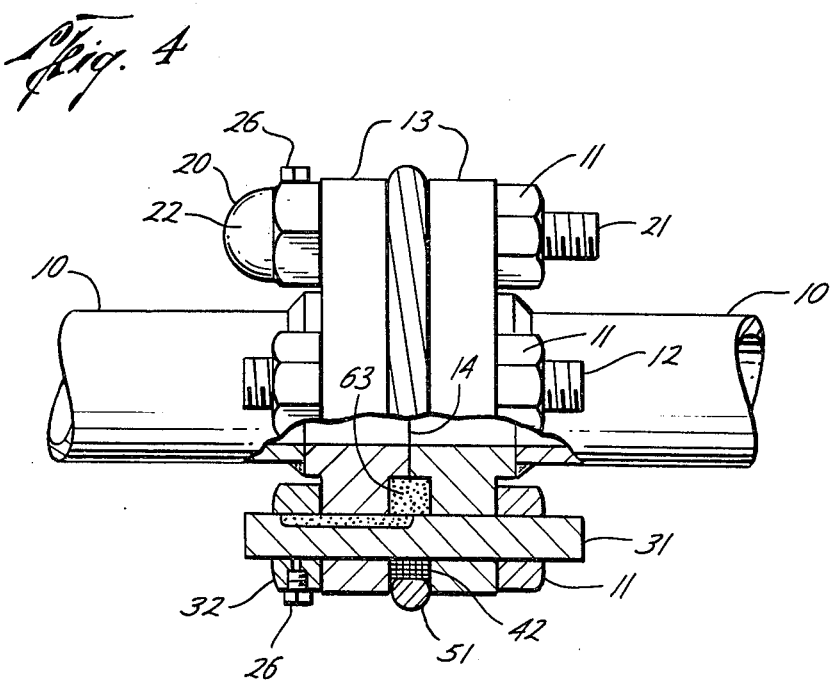

METHOD AND APPARATUS FOR SEALING A PIPELINE LEAK

This is a division of application Ser. No. 677,864, filed Apr. 16, 1976, by George W. Harrison and Billie G. Moore, entitled "Method and Apparatus for Sealing Pipeline Leak", now U.S. Pat. No. 4,073,836.

BACKGROUND OF THE INVENTION

This invention relates to methods and apparatus for the repair of leaks at pipeline flanges and more particularly to methods and apparatus for the repair of such leaks in pipelines accomplished without interference with the operation of the pipeline.

The construction of pipelines involves many techniques, but always requires the joining of multiple pieces of pipe. The conventional methods of joining pipe together include such means as welding, threading, or the use of flanged ends which are bolted together. Where flanged bolted connections are used, it is not uncommon for leaks to occur in the junction between the two pieces of pipe whereby repairs are required for continued pipeline operation.

It is obvious that the preferred repair of a pipeline flange leak would be accomplished without the need to disassemble the flanged connection. Since pipelines are usually connected to operating systems at either end, it is frequently impractical to shut down the pipelines so as to facilitate the repair of the flanged connection.

Various techniques have been developed to attempt to stop such leaks at the flanged connections of pipelines without shutting down the pipeline. One such method uses a cable and a cable tensioning device to close the gap between the flanges and the area to be sealed and hold down wedge-shaped devices adjacent to the leaking area. A sealant is then injected into the gap between the wedges and the cable so that the cable seals and holds the sealant in place while it cures. The cable and tensioning device may then either remain in place to hold the sealant over the leak or the cable may be removed when sufficient friction forces are generated by the wedges to hold the sealant in place. This method seals only a portion of the periphery of the flanged section and is generally unsatisfactory where the seal is subjected to substantial internal pressure.

The disadvantages of the above method and other techniques and apparatus are overcome by the present invention in that the leak may be sealed while the pipeline remains in continuous operation and a permanent seal is provided around the entire periphery of the flange.

SUMMARY OF THE INVENTION

In a preferred embodiment of the present invention, a method and apparatus are provided to seal leaks in pipeline flange joints while the pipeline remains in operation. The method provides for installing slotted studs in the flange bolt locations so that the slot extends from the gap between the pipe flange faces to the exterior portion of the pipe flange and defines a leakage relief passage. Injection valve means are installed open to the stud slots to relieve internal pressure which may build up as wire wrapping is put in place. A wire is wrapped to fill the volume of the gap above the flange bolts. Loops of wire are tightly formed and smoothly adjacent to one another to form a plurality of layers. At about two or three layer intervals, the loops are secured by passing the wire under and around the preceding loop. If it is desired, steel wool or some other suitable flexible sealing material may be placed between intermediate layers of the wire wrapping to enhance sealing. The wrapping is continued until the gap is almost full and a small lip is left between the last layer of wire wrap and the top edge of each of the flanges.

A cable is next positioned within the groove defined by the opposed small lips with a cable tensioning block positioned adjacent the leaking area. The cable is then tensioned by tightening a jack screw of the cable tensioning device. The injection valve opposite the leaking area and the cable tensioning device is then closed, a sealant injection means is connected to the injection valve, and a suitable sealant is then injected into the gap area beneath the wire wrap. The cable is repositioned and these steps are repeated at each injection valve location around the periphery of the flange until the leaks are stopped and the sealant flows out around the wire cable. After a short interval of time, sealant is again injected at each injection valve location to insure complete filling of the gap. The cable is removed and sealant is applied around the periphery of the gap between the flanges until the sealant is level with the edge of the flanges. The injection valves are then removed from the injection nuts and plugs installed in the vacated holes of the valve nuts to complete the installation.

Further, apparatus is provided whereby the above technique can be accomplished. More particularly, a slotted stud is provided which replaces an original bolt at the flanged connection, the slot length being such that it will provide a communication between the interior of the gap between the flanges and the exterior of one of the flanges. An injection nut is provided to fit the slotted end of the stud with a hole provided in the nut extending from the interior to the exterior so that the nut can be positioned with the hole opening to the slot in the stud. An injection valve then mates with the end of the hole opposite the slot so that a valved entry is provided to the gap between the pipe flanges. A wire is wrapped about the periphery of the flanged connection to fill the area of the gap between the pipe flanges and above the outer surfaces of the flange bolts and to provide the strength necessary to withstand the internal pressures which may be generated as a result of the leaking pipe joint. The injection valves relieve the internal pressure while the wire wrap is being installed. A cable and a cable tensioninng means are used to provide external pressure on the wire wrap while a sealant is injected beneath the wire wrap under pressure in order to fill the gap and stop the leaks. An injection means is then used to inject the sealant under pressure into the gap between the flanges and beneath the wire wrap. The sealant is chosen to be compatible with the expected system operating parameters.

It is obvious that flanged connections are used in the construction of many items in addition to pipelines, such as pressure vessels and heat exhangers. Therefore the use of the terms pipeline flange and pipe flange is intended and should be construed to be broad enough to encompass bolted flanged connections in general so that application of the invention is not limited to use on pipelines.

It is a feature of the present invention to provide a method and apparatus for sealing a pipeline flange leak.

It is another feature of the present invention to provide a method and apparatus for sealing a pipeline flange leak while the pipeline and related systems remain in operation.

It is yet another feature of the present invention to provide a method and apparatus for providing a permanent seal for a pipeline flange leak capable of withstanding system operating parameters.

It is still another feature of the present invention to provide for a method and apparatus for sealing a pipe flange leak which can be performed in the field with ordinary tools and personnel.

BRIEF DESCRIPTION OF THE DRAWINGS

In order that the manner in which the above-recited advantages and features of the invention are attained can be understood in detail, a more particular description of the invention may be had by reference to specific embodiments thereof which are illustrated in the appended drawings, which drawings form a part of this specification. It is to be noted, however, that the appended drawings illustrate only typical embodiments of the invention and therefore are not to be considered limiting of its scope for the invention may admit to further equally effective embodiments.

In the drawings:

FIG. 3 is a side view showing the cable and cable tensioning device installed during sealant injection.

FIG. 4 is a view partially in cross-section of the installation.

DETAILED DESCRIPTION OF THE PREFERRED EMBODIMENTS

Figure 1:
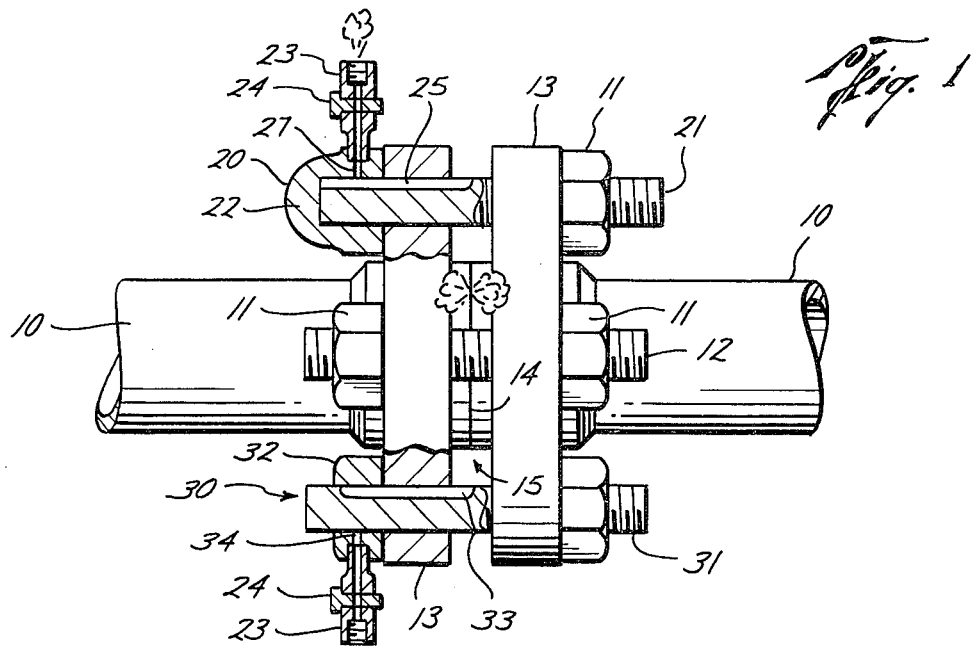
FIG. 1 is a side view partially in cross-section showing the installed injection valves on a leaking pipeline flange.

FIG. 1 is a side view of the pipe flange connection showing the installed injection valves. More particularly, pipes 10 meet at pipe joint 14 and are held together by a bolted connection formed by inserting bolts 12 through the flanges 13 on each piece of pipe 10 and threading nuts 11 onto the bolts 12 so as to seal pipe joint 14. If a leak develops at pipe joint 14, it is desirable to repair the leak without the need for disassembling the flanged connection. In effecting such a repair, the first step is the installation of a plurality of injection valve means 20. Injection valve means 20 is used to relieve any internal pressure build up which may occur between pipe flanges 13 during subsequent operations described herebelow.

To install injection valve means 20, a conventional bolt 12 is first removed and slotted stud 21 is inserted through flanges 13. Slot 25 extends from one end of stud 21 a distance sufficient to extend into gap 15 between pipe flanges 13. Nut 11 is installed on stud 21 opposite the slotted end and threaded a sufficient distance to bring slot 25 into communication with gap 15. Capped injection nut 20 is threaded onto slotted stud 21 so as to engage flange 13 and align hole 27 through injection nut 22 with slot 25. Nut 11 is then tightened to complete the installation. Injection valve means 20 are installed at one or more locations around flange 13. FIG. 1 also shows another type of injection valve means 30 including a stud 31 that is formed to define a slot 33 that extends from gap 15 to the exterior of the flange 13 but terminates short of the end of stud 31. Injection nut 32 is in the form of a standard nut and is threaded onto stud 31 a sufficient distance to contact flange 13 and align hole 34 extending through injection nut 32 with slot 33. To complete the installation, injection valve 23 is connected to injection nut 22 or injection nut 32 and valve stem 24 is rotated so as to open injection valve 23.

Figure 2:
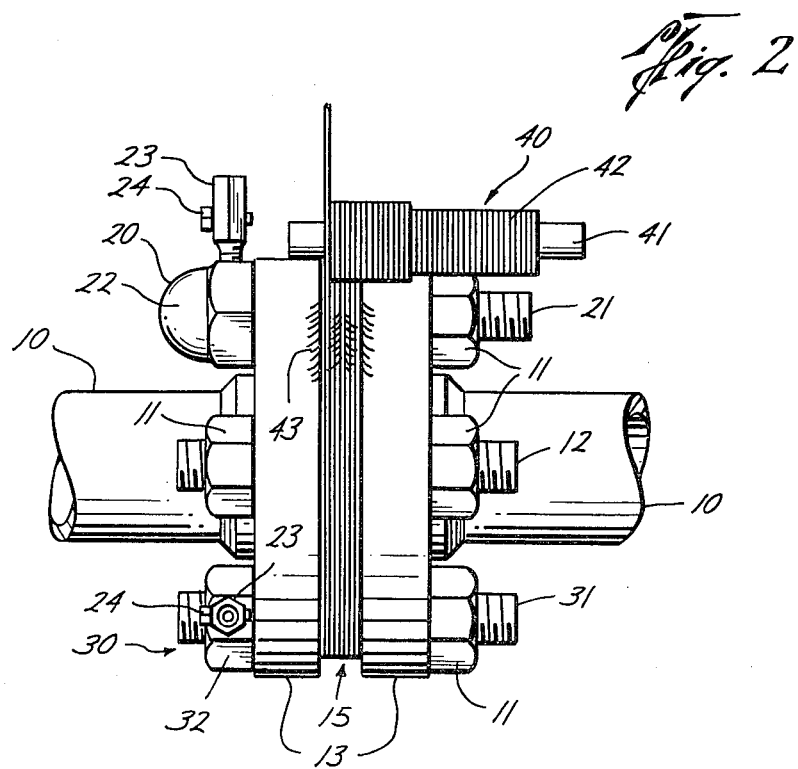
FIG. 2 is a side view showing the wire being wrapped and secured.

FIG. 2 is a side view showing wire wrapping and securing operations. Wire wrap means 40 is provided, generally consisting of roll 41 and wire 42 wound thereon. Wire 42 is generally of sufficient strength to withstand the expected system operating conditions and is typically a high tensile strength metal wire. Depending on the application and the internal leak pressures and corrosiveness of the leaking fluid, steel, stainless steel, copper or monel wire may be used. To begin the wire wrapping operations, one end of wire 42 is first securely tied to bolt 12 in flange gap 15 and wire 42 is looped over the outer surface of flange bolts 12, slotted studs 21 and slotted studs 31 if installed, so as to encircle the flanged connection. Each loop of wire 42 is tightly drawn and arranged to fit smoothly against the preceedng loop until one layer has been installed across gap 15. Subsequent layers of wire 42 are formed by continued wrapping of wire 42 in smooth, tight loops inside gap 15.

At intermediate points in the wire wrapping operation, generally after two or three layers have been formed, the wrapping is secured by passing the roll of wire 41 under and around the preceeding loop. If desired, roll 41 may be so passed under and around the loop a number of times. The wrapping is secured in this fashion at subsequent points in the operation and it is perferrable to arrange the secured sections at different locations about the periphery of pipe flange gap 15. If desired, a sealing material such as steel wool 43 may be laid between intermediate layers of wire 42 during the wrapping operations. The wrapping operation continues until pipe flange gap 15 is almost filled. A small lip, generally about ⅛-inch, is left between the top of the last layer of wire 42 and the top of flange 13. Wire 42 is secured by passing roll 41 under and around the last preceeding loop and wire 42 is cut to complete the wrapping operation.

FIG. 3 is a side view showing the cable and cable tensioning device installed during sealant injection. After the wire wrap is completed, cable tensioning means 50 is installed over the top layer of wire 42 by placing cable 51 around the flanges 13 and adjacent wire 42. Cable tensioning block 54 is placed adjacent the leaking area and cable 51 is securely clamped to cable clamp 52 by tightening nut 53 and the cable 51 is tensioned by tightening jack screw 55 against tensioning block 54. The sealant injection operation is now begun by closing valve stem 24 of injection valve 23 nearest the area where cable 51 engages flanges 13. Sealant injection means 60 is connected to injection valve 23 and valve stem 24 is rotated to open injection valve 23. Sealant 63 is injected into gap 15 beneath the wire wrap 42, via injection valve 23 until a pressure build up occurs or sealant 63 blows out anywhere around the wire wrap 42 and flanges 13. The cable 51 is left in place long enough for the sealant to set. Valve stem 24 is then rotated to close injection valve 23 and injection means 60 is disconnected from injection valve 23.

Jack screw 55 is then turned to remove the tension in cable 51 and cable tensioning means 50 is rotated to a position adjacent another injection valve 23. Sealant injection means 60 is then connected to the injection valve 23 adjacent the new contact between cable 51 and wire 42 and the process is repeated. Sealant 63 is injected to each injection valve 23 in turn until the leaks are stopped. Sealant 63 is then injected slowly until sealant 63 flows out around wire 42 or cable 51. The sealant 63 is allowed to sit for a short period of time, approximately 10 minutes, and then sealant 63 is again pumped into all injection valves 23.

FIG. 4 is a view of the seal immediately prior to removing cable 51 from around the wire wrap. Cable tensioning means 50 being removed after the sealant 63 has set a sufficient time to cure in place. Injection valve 23 has been removed from injection nut 22 and injection nut 32 and plugs 26 have been installed to close the holes 27 and 34 respectively. Sealant 63 is applied to fill the lip between flanges 13 and wire 42. Wire 42 generally fills gap 15 above the flange bolts 12 and acts as strength member to hold sealant 63 in place under the expected system internal pressure. Sealant 63 is placed over the outer layer of wire 42 until flush with the outer periphery of flanges 13 to provide a smooth, finished appearance for the completed flange seal.

Sealants are selected for the particular application. At low pressures a granular teflon with an injection vehicle, such as oil may be used. Most applications at higher pressures must use a quick hard setting sealant commonly having a base of rubber or phenolic. Setting times are commonly 5 - 15 minutes.

Numerous variations and modifications may obviously be made in the structure herein described without departing from the present invention. Accordingly, it should be clearly understood that the forms of the invention herein described and shown in the figures of the accompanying drawings are illustrative only and are not intended to limit the scope of the invention.

What is claimed is:

1. An assembly for repair of leaks in flanged connections wherein a gap exists between flange pieces forming the connections, comprising:
    (a) a plurality of bolts at least one of which has a slot in one end thereof, said bolts being spaced about the periphery of the connection to connect the flange pieces to each other and extending in the gap of the flanged connections;
    (b) each of said bolts having a slot being positioned such that each of the slots extends from outside one of the flange pieces, through the flange piece, into the gap;
    (c) nut means for securing said bolts to said flanged connections;
    (d) at least one of said nut means secured to one of each of said bolts having a slot including an injection passage therethrough wherein securing each of said at least one nut means on an associated bolt enables communication of the passage with the slot in said bolt;
    (e) injection valve means for mounting in communication with the passage of said at least one of the nut means;
    (f) wrapping means for wrapping an elongated flexible member around the bolts in said gap a plurality of times to enclose the gap between the flange pieces in continuous layers for enabling sealant injected through the injection valve to be placed under the wrapped flexible member for repairing the flanged connection.

* * * * *